US 11,378,166 B2

(12) United States Patent
Beccari et al.

(10) Patent No.: US 11,378,166 B2
(45) Date of Patent: Jul. 5, 2022

(54) RECIPROCATING PUMP DRIVE

(71) Applicant: Dana Motion Systems Italia S.R.L., Reggio Emilia (IT)

(72) Inventors: Fabio Beccari, Bibbiano (IT); Michele Brunazzo, Carpi (IT); Umberto Re, Modena (IT); Filippo Vinci, Parma (IT)

(73) Assignee: Dana Motion Systems Italia S.R.L., Reggio Emilia (IT)

(*) Notice: Subject to any disclaimer, the term of this patent is extended or adjusted under 35 U.S.C. 154(b) by 0 days.

(21) Appl. No.: 16/981,662

(22) PCT Filed: Mar. 20, 2019

(86) PCT No.: PCT/EP2019/056946
§ 371 (c)(1),
(2) Date: Sep. 16, 2020

(87) PCT Pub. No.: WO2019/180073
PCT Pub. Date: Sep. 26, 2019

(65) Prior Publication Data
US 2021/0108710 A1    Apr. 15, 2021

(30) Foreign Application Priority Data
Mar. 21, 2018   (EP) .................................... 18425014

(51) Int. Cl.
*F16H 37/06*    (2006.01)
*F04B 17/00*    (2006.01)

(52) U.S. Cl.
CPC ........... *F16H 37/065* (2013.01); *F04B 17/00* (2013.01); *F16H 2702/02* (2013.01)

(58) Field of Classification Search
CPC ................................ F16H 37/06; F04B 17/00
See application file for complete search history.

(56) References Cited

U.S. PATENT DOCUMENTS 2,390,240 A * 12/1945 De Lancey ............. F16H 47/04
475/72
3,665,788 A * 5/1972 Nyman .................. B60K 6/105
475/72

(Continued)

FOREIGN PATENT DOCUMENTS

WO    2017123656 A1    7/2017

OTHER PUBLICATIONS

ISA European Patent Office, International Search Report Issued in Application No. PCT/EP2019/056946, dated May 14, 2019, WIPO, 3 pages.

*Primary Examiner* — Derek D Knight
(74) *Attorney, Agent, or Firm* — McCoy Russell LLP

(57) ABSTRACT

A reciprocating pump drive is disclosed. The reciprocating pump drive comprises a housing and a transmission mechanism. The transmission mechanism comprising an input shaft rotatably supported in the housing. The input shaft has an input shaft axis. An intermediate shaft is rotatably supported in the housing and coupled to the input shaft. The intermediate shaft has an intermediate shaft axis wherein the input shaft axis is parallel to the intermediate shaft axis. A gear assembly is coupled to the intermediate shaft. An output shaft is coupled to the gear assembly. The output shaft has an output shaft axis wherein the intermediate shaft axis is coaxially aligned to the output shaft axis.

20 Claims, 3 Drawing Sheets

(56) References Cited

U.S. PATENT DOCUMENTS

| | | | |
|---|---|---|---|
| 4,721,439 A | 1/1988 | Leinweber | |
| 8,215,109 B1 | 7/2012 | Hauser et al. | |
| 2006/0042843 A1 | 3/2006 | Yasuda et al. | |
| 2017/0089437 A1* | 3/2017 | Arnelof | F16H 3/54 |

* cited by examiner

RECIPROCATING PUMP DRIVE

CROSS-REFERENCE TO RELATED APPLICATIONS

The present application is a U.S. National Phase of International Application No. PCT/EP2019/056946, entitled "RECIPROCATING PUMP DRIVE", and filed on Mar. 20, 2019. International Application No. PCT/EP2019/056946 claims priority to European Patent Application No. 18425014.0, entitled "RECIPROCATING PUMP DRIVE", and filed on Mar. 21, 2018. The entire contents of the above-listed applications are hereby incorporated by reference for all purposes.

TECHNICAL FIELD

This disclosure relates to the field of oil drilling equipment, particularly to reciprocating pumps used in oil and gas drilling, more particularly to reciprocating pump drives, and even more particularly to reciprocating pump drives for mud pumps.

BACKGROUND AND SUMMARY

Reciprocating pumps are positive displacement pumps. Reciprocating pumps may have a pump mechanism, a power source, and a transmission mechanism connecting the power source to the pump mechanism. The reciprocating pump is driven by reciprocating pump drive. The transmission mechanism transmits power from the power source to the pump mechanism. The pump mechanism comprises a linkage, such as a crankshaft or a different mechanism, for the transformation of a rotary motion into a translational motion, coupled to a single acting piston.

The transmission mechanism couples an input shaft connected to the power source to an output shaft connected to the aforesaid linkage. An example of a transmission mechanism is a belt connecting pulleys of different diameters. A further example of a transmission mechanism is a sprocket and crown gears having different diameters and number of teeth.

An example of a reciprocating pump is a mud pump. Mud pumps are used in drilling a wellbore for oil and gas wells. Mud pumps provide lubrication to drilling equipment. Generally, mud pumps have an inlet connected to a mud pit and an outlet connected to a drill for supply of mud. The mud that is pumped can be a mixture of mud, water, oil, and other materials.

WO2017123656 discloses a pumping system with connectable and disconnectable pumping assemblies. The pumping assemblies include transmissions between the power end and fluid end. The transmission includes a cam assembly or a linkage or rocker assembly. The transmission has an input shaft, and an offset collar including a throughbore extending at a non-zero angle relative to the input shaft axis. In addition, the transmission may include a linking member including a spherical member, a first shaft and a second shaft. The first shaft is received with the throughbore of the offset collar, and the spherical member is slidingly received within a seat.

The present disclosure is directed, at least in part, to improving or overcoming one or more aspects of the prior art system.

The present disclosure describes a reciprocating pump drive comprising a housing; and a transmission mechanism. The transmission mechanism comprising an input shaft rotatably supported in the housing. The input shaft has an input shaft axis. An intermediate shaft is rotatably supported in the housing and coupled to the input shaft. The intermediate shaft has an intermediate shaft axis wherein the input shaft axis is parallel to the intermediate shaft axis. A gear assembly is coupled to the intermediate shaft. An output shaft is coupled to the gear assembly. The output shaft has an output shaft axis wherein the intermediate shaft axis is coaxially aligned to the output shaft axis.

BRIEF DESCRIPTION OF THE FIGURES

The foregoing and other features and advantages of the present disclosure will be more fully understood from the following description of various embodiments, when read together with the accompanying drawings, in which.

DETAILED DESCRIPTION

Figure 1:
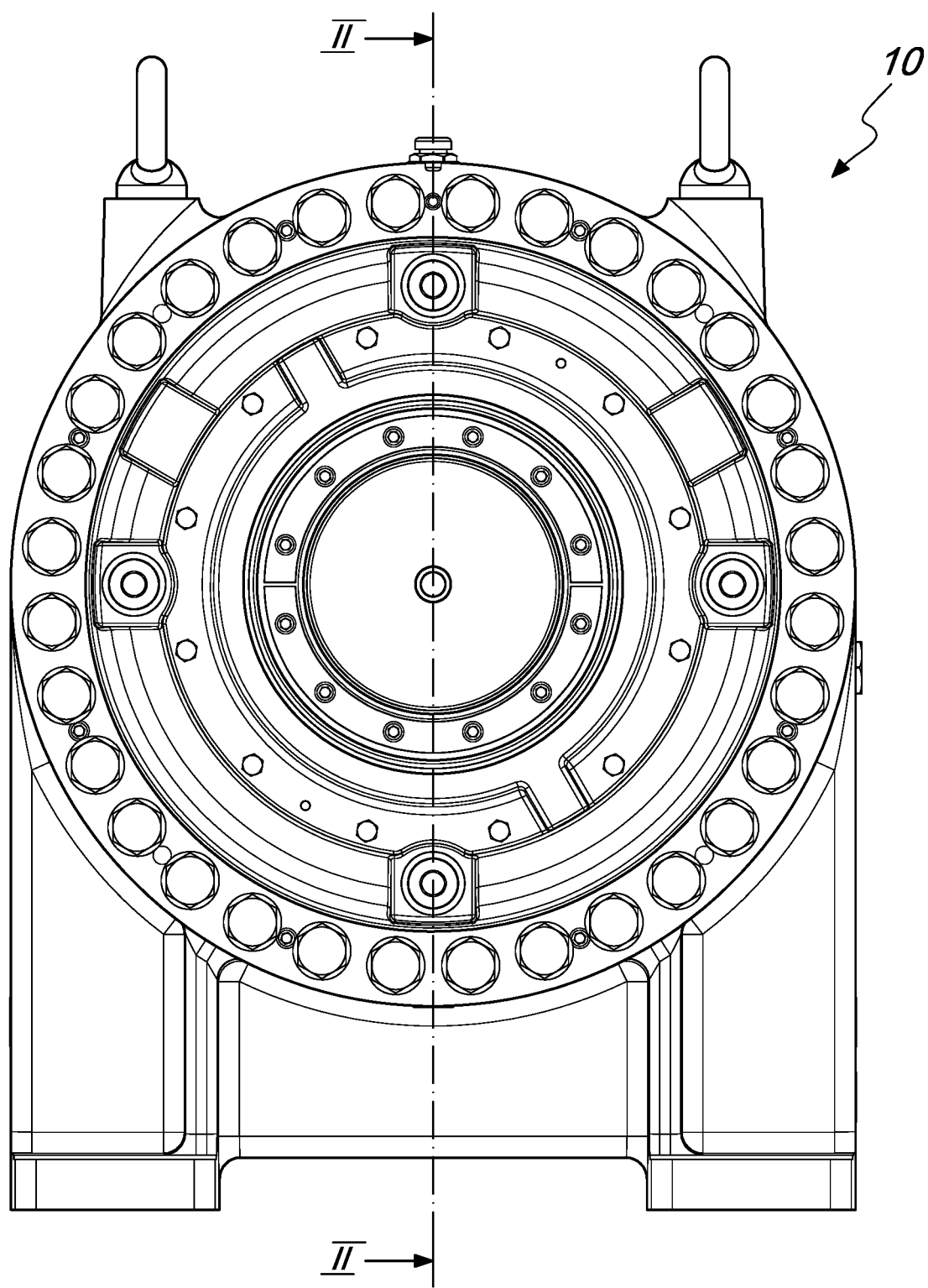
FIG. 1 is a front view of a reciprocating pump drive according to the present disclosure.

This disclosure generally relates to a reciprocating pump drive for transmission of power to a piston pump in a fluid pump. FIG. 1 illustrates a front view of the reciprocating pump drive 10.

Figure 2:
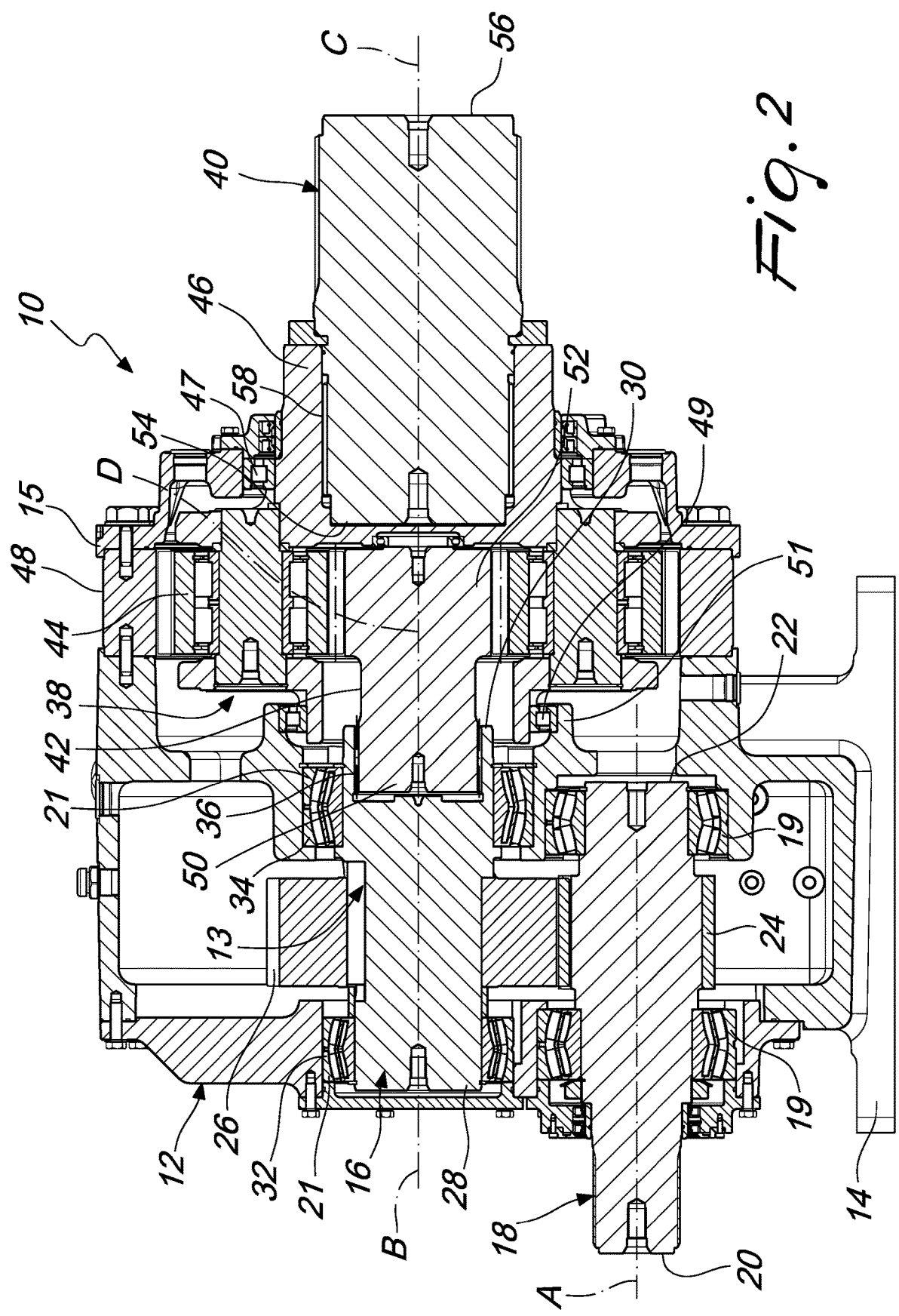
FIG. 2 is a sectional view of the reciprocating pump drive of FIG. 1 through the line II-II.

FIG. 2 illustrates a section through the reciprocating pump drive 10. In an embodiment, the reciprocating pump drive 10 is a mud pump drive. The reciprocating pump drive 10 is supplied with power from an engine/generator (not shown). The reciprocating pump drive 10 transmits power to a pump (not shown). The reciprocating pump drive 10 has a housing 12.

In an embodiment, housing 12 is coupled to a base 14. Housing 12 is fixedly connected to the base 14. In an alternative embodiment, the base 14 is connected to a gear system or an output support cover 15. In a further alternative embodiment, housing 12 comprises the base 14 and the support cover 15.

Housing 12 is configured to enclose a transmission system 13 for the transmission of power from the engine/generator to the reciprocating pump. Housing 12 is provided with bearings for supporting the transmission system 13. The transmission system 13 comprises an input shaft 18, an intermediate shaft 16, a gear assembly 38 and an output shaft 40.

The mud pump drive 10 comprises the input shaft 18. The input shaft 18 is rotatably supported in the housing 12 by bearings 19. The input shaft 18 is connected to the engine/generator. Input shaft 18 receives rotatory power from the engine/generator. Input shaft 18 has a first input shaft end 20 and a second input shaft end 22. First input shaft end 20 is connectable to the engine/generator. Second input shaft end 22 is rotatably coupled to the housing 12. Input shaft 18 extends axially in the housing 12. In an embodiment, input shaft 18 partially extends externally from the housing 12. First input shaft end 20 is positioned external to the housing 12.

The input shaft 18 has an input shaft axis A. Input shaft 18 is rotatable about the input shaft axis A. The input shaft axis A may correspond to the longitudinal axis of the input shaft 18. In an embodiment, input shaft axis A is parallel to the base 14.

In an embodiment, the input shaft 18 is provided with at least one input gear 24. In a further embodiment, the input gear 24 is a helical gear. In an alternate further embodiment, the input gear 24 is a spur gear.

The input gear 24 is positioned along the length of the input shaft 18. The input gear 24 may be positioned between the first and second input shaft ends 20, 22. The input gear 24 may be spaced away from the second input shaft end 22. The input gear 24 may be spaced away from the first input shaft end 20.

The reciprocating pump drive 10 comprises the intermediate shaft 16. The intermediate shaft 16 is rotatably supported in the housing 12 by bearings 21. The intermediate shaft 16 is coupled to the input shaft 18. Intermediate shaft 16 receives rotatory power from the input shaft 18.

Intermediate shaft 16 has a first intermediate shaft end 28 and a second intermediate shaft end 30. Intermediate shaft 16 is contained in the housing 12. First intermediate shaft end 28 is rotatably coupled to the housing 12. Second intermediate shaft end 30 may be configured to have a coupling means 36. Intermediate shaft 16 extends axially in the housing 12.

In an embodiment, the coupling means 36 is a bore. The bore extending axially into the intermediate shaft 16 from second intermediate shaft end 30. The wall enclosing bore is formed by the second intermediate shaft end 30 of the intermediate shaft 16.

The intermediate shaft 16 has an intermediate shaft axis B. Intermediate shaft 16 is rotatable about the intermediate shaft axis B. The intermediate shaft axis B may correspond to the longitudinal axis of the intermediate shaft 16. In an embodiment, intermediate shaft axis B is parallel to the input shaft axis A. The intermediate shaft 16 is laterally spaced from the input shaft 18.

In an embodiment, the intermediate shaft 16 is provided with at least one intermediate gear 26. In a further embodiment, the intermediate gear 26 is a helical gear. In an alternate further embodiment, the intermediate gear 26 is a spur gear. The intermediate gear 26 meshes with the input gear 24.

The intermediate gear 26 is positioned along the length of the intermediate shaft 16. The intermediate gear 26 may be positioned between the first and second intermediate shaft ends 28, 30. The intermediate gear 26 may be spaced away from the second intermediate shaft end 30. The intermediate gear 26 may be spaced away from the first intermediate shaft end 28.

In an embodiment, a helical gear set couples the input shaft 18 to the intermediate shaft 16 through the at least one input gear 24 and the at least one intermediate gear 26. In an alternate embodiment, a spur gear set couples the input shaft 18 to the intermediate shaft 16 through the at least one input gear 24 and the at least one intermediate gear 26.

The reciprocating pump drive 10 comprises the gear assembly 38. The gear assembly 38 is coupled to the intermediate shaft 16. The gear assembly 38 is coupled to the second intermediate shaft end 30. The gear assembly 38 receives rotatory power from the intermediate shaft 16. In an embodiment, the gear assembly 38 is supported in the housing 12 for transmission of rotatory power.

The gear assembly 38 is a planetary gear assembly. The planetary gear assembly having a sun gear 42, planetary gears 44, a planetary gear carrier 46 and a ring gear 48. The planetary gear assembly 38 transmits the rotational drive forces from the intermediate shaft 16 to the output shaft 40.

The sun gear 42 is directly coupled to the intermediate shaft 16 such that the sun gear 42 rotates with the intermediate shaft 16. Sun gear 42 is coupled to the second intermediate shaft end 30. Sun gear 42 is coupled to the intermediate shaft 16 by the coupling means 36. In an embodiment, the intermediate shaft 16 is coupled to the sun gear 42 through a spline coupling.

The sun gear 42 is longitudinally extended and has a sun gear axis D. The sun gear 42 is rotatable about the sun gear axis D. The sun gear axis D may correspond to the longitudinal axis of the sun gear 42. The sun gear axis D is coaxially aligned with the intermediate shaft axis B. The sun gear axis D is parallel to the input shaft axis A.

The sun gear 42 has a first sun gear end 50 and a second sun gear end 52. The first sun gear end 50 is coupled to second intermediate shaft end 30. In an embodiment, the first sun gear end 50 is configured as a male spline for insertion into the coupling means 36 formed as a bore configured as a female spline. The sun gear 42 is contained in the housing 12.

The planetary gears 44 are rotatably mounted on the planetary gear carrier 46. The planetary gears 44 mesh with the sun gear 42. The planetary gears 44 are engaged with the sun gear 42 adjacent the second sun gear end 52. The planetary gears 44 are contained in the housing 12. The ring gear 48 is directly coupled to the housing 12. The ring gear 48 circumscribes the sun gear 42. The ring gear 48 surrounds the planetary gears 44. The ring gear 48 is coaxially aligned with both the sun gear 42 and the planetary gear carrier 46. The planetary gears 44 mesh with the ring gear 48.

In an embodiment, the base 14 is connected to the ring gear 48. In an alternate embodiment, the base 14 is coupled to the output support cover 15. The output support cover 15 is connected to the ring gear 48. The planetary gear carrier 46 rests on the output support cover 15 via a bearing 47 and inside the housing 12 via another bearing 49 supported in a flange 51.

The reciprocating pump drive 10 comprises the output shaft 40. The output shaft 40 is coupled to the gear assembly 38. The planetary gear assembly 38 transmits the rotational drive forces to the output shaft 40. The output shaft 40 has a first output shaft end 54 and a second output shaft end 56. The output shaft 40 extends externally to the housing 12 and the output support cover 15 from the planetary gear carrier 46. The output shaft 40 is connected to the pump. Output shaft 40 transmits rotatory power to the pump. Second output shaft end 56 is positioned external to the housing 12 and the support cover 15.

The output shaft 40 having a machine shaft axis C. The output shaft 40 is rotatable about the output shaft axis C. The output shaft axis C may correspond to the longitudinal axis of the output shaft 40. The output shaft axis C is coaxially aligned to the intermediate shaft axis B. The output shaft axis C is coaxially aligned to the sun gear axis D. The output shaft 40 is positioned offset to the input shaft 18. The output shaft axis C is parallel to the input shaft axis A.

The gear ratio of the transmission system 13 comprising the gearing 24, 26 and the planetary gear assembly 38 is generally comprised from 5 to 20 and preferably equal to 10.

The planetary gear carrier 46 is directly coupled to the output shaft 40. First output shaft end 54 is coupled to the planetary gear carrier 46. In an embodiment, the first output shaft end 54 is configured as a male spline for insertion into the planetary gear carrier 46 having a hole 58 configured as a female spline.

Figure 3:
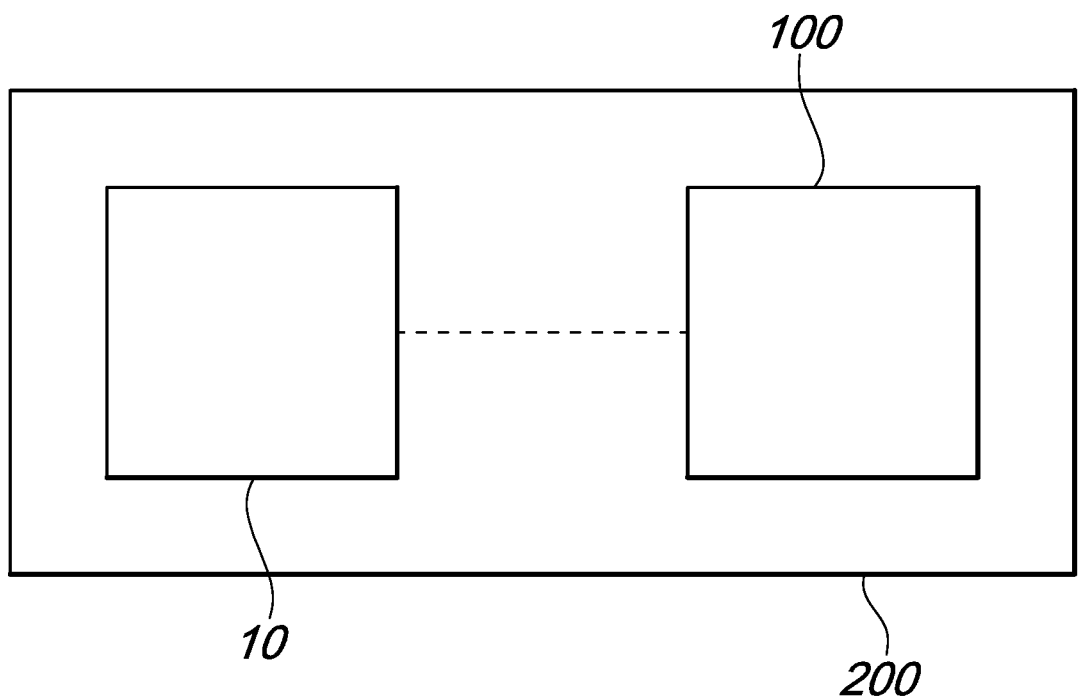
FIG. 3 is a schematic illustration of a reciprocating pump comprising the reciprocating pump drive of FIG. 1.

With reference to FIG. 3, the reciprocating pump drive 10 is comprised in a reciprocating pump 200. In an embodiment, the reciprocating pump 200 is a mud pump. The reciprocating pump 200 comprises a pump mechanism 100 connected to the reciprocating pump drive 10. The pump mechanism 100 is configured to pump fluid.

The skilled person would appreciate that foregoing embodiments may be modified or combined to obtain the mud pump drive 10 of the present disclosure.

This disclosure describes a reciprocating pump drive 10 for use in a reciprocating pump 200. The reciprocating pump drive 10 is efficient. The reciprocating pump drive 10 requires low maintenance and has a longer operational life. The transmission system 13 is enclosed in the housing 12 of the reciprocating pump drive 10 thereby having greater protection from the environment.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A reciprocating pump drive, comprising:
   a housing; and
   a transmission mechanism, the transmission mechanism comprising:
      an input shaft rotatably supported in the housing, the input shaft having an input shaft axis;
      an intermediate shaft rotatably supported in the housing and coupled to the input shaft, the intermediate shaft having an intermediate shaft axis wherein the input shaft axis is parallel to the intermediate shaft axis;
      a planetary gear assembly coupled to the intermediate shaft, the planetary gear assembly having a sun gear with a sun gear axis, and the planetary gear assembly having a ring gear, the ring gear being coupled to the housing; and
      an output shaft coupled to the planetary gear assembly, the output shaft having an output shaft axis wherein the intermediate shaft axis is coaxially aligned to the output shaft axis.

2. The reciprocating pump drive of claim 1, wherein a helical gear set couples the input shaft to the intermediate shaft.

3. The reciprocating pump drive of claim 1, wherein a spur gear set couples the input shaft to the intermediate shaft.

4. The reciprocating pump drive of claim 1, wherein the sun gear axis is coaxially aligned with the intermediate shaft axis.

5. The reciprocating pump drive of claim 1, wherein the sun gear axis is coaxially aligned with the output shaft axis.

6. The reciprocating pump drive of claim 1, wherein the sun gear is coupled to the intermediate shaft through a spline coupling.

7. The reciprocating pump drive of claim 1, wherein the planetary gear assembly has a planetary gear carrier, the planetary gear carrier being coupled to the output shaft.

8. A reciprocating pump, comprising the reciprocating pump drive according to claim 1.

9. The reciprocating pump of claim 8, comprising a pump mechanism connected to the reciprocating pump drive.

10. The reciprocating pump drive of claim 1, wherein a gear couples the input shaft to the intermediate shaft, wherein the sun gear axis is coaxially aligned with the intermediate shaft axis, wherein the sun gear axis is coaxially aligned with the output shaft axis, wherein the sun gear is coupled to the intermediate shaft through a spline coupling, and wherein the planetary gear assembly has a planetary gear carrier, the planetary gear carrier being coupled to the output shaft.

11. A reciprocating pump drive, comprising:
    a housing; and
    a transmission mechanism, the transmission mechanism comprising:
       an input shaft rotatably supported in the housing, the input shaft having an input shaft axis;
       an intermediate shaft rotatably supported in the housing and coupled to the input shaft, the intermediate shaft having an intermediate shaft axis wherein the input shaft axis is parallel to the intermediate shaft axis;
       a gear assembly coupled to the intermediate shaft; and
       an output shaft coupled to the gear assembly, the output shaft having an output shaft axis wherein the intermediate shaft axis is coaxially aligned to the output shaft axis.

12. The reciprocating pump drive of claim 11, wherein the gear assembly is a planetary gear assembly, the planetary gear assembly having a sun gear with a sun gear axis.

13. The reciprocating pump drive of claim 12, wherein the sun gear axis is coaxially aligned with the intermediate shaft axis.

14. The reciprocating pump drive of claim 12, wherein the sun gear axis is coaxially aligned with the output shaft axis.

15. The reciprocating pump drive of claim 12, wherein the sun gear is coupled to the intermediate shaft through a spline coupling.

16. The reciprocating pump drive of claim 12, wherein the planetary gear assembly has a planetary gear carrier, the planetary gear carrier being coupled to the output shaft.

17. The reciprocating pump drive of claim 12, wherein the planetary gear assembly has a ring gear, the ring gear being coupled to the housing.

18. A reciprocating pump drive, comprising:
    a housing; and
    a transmission mechanism, the transmission mechanism comprising:
       an input shaft rotatably supported in the housing, the input shaft having an input shaft axis;
       an intermediate shaft rotatably supported in the housing and coupled to the input shaft, the intermediate shaft having an intermediate shaft axis wherein the input shaft axis is parallel to the intermediate shaft axis;
       a gear assembly coupled to the intermediate shaft; and
       an output shaft coupled to the gear assembly, the output shaft having an output shaft axis,
       wherein the intermediate shaft axis is in line with the output shaft axis.

19. The reciprocating pump drive of claim 18, wherein the intermediate shaft is laterally spaced from the input shaft.

20. The reciprocating pump drive of claim 18, wherein the gear assembly is a planetary gear assembly, the planetary gear assembly having a sun gear with a sun gear axis, and wherein the intermediate shaft axis is in line with the sun gear axis.

* * * * *